(12) United States Patent  (10) Patent No.: US 12,392,654 B2
Makley et al.  (45) Date of Patent: Aug. 19, 2025

(54) PLATEN STABILIZATION SYSTEM

(71) Applicant: TOSHIBA GLOBAL COMMERCE SOLUTIONS, INC., Durham, NC (US)

(72) Inventors: Hye S. Makley, Morrisville, NC (US); Timothy W. Crockett, Raleigh, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/408,458

(22) Filed: Jan. 9, 2024

(65) Prior Publication Data

US 2025/0224268 A1  Jul. 10, 2025

(51) Int. Cl.
*G01G 7/04* (2006.01)
*A47F 9/04* (2006.01)
*G01G 19/414* (2006.01)

(52) U.S. Cl.
CPC .............. *G01G 7/04* (2013.01); *A47F 9/047* (2013.01); *G01G 19/4144* (2013.01); *A47F 2009/041* (2013.01)

(58) Field of Classification Search
None
See application file for complete search history.

(56) References Cited

U.S. PATENT DOCUMENTS

2006/0154569 A1* 7/2006 Doyle .................... B24B 37/04
451/8
2021/0276346 A1* 9/2021 Kobayashi ............ B41J 11/008

* cited by examiner

*Primary Examiner* — Kristy A Haupt
(74) *Attorney, Agent, or Firm* — Patterson + Sheridan, LLP; Gero G. McClellan (57) ABSTRACT

A system includes a platen assembly having a platen and a magnet coupled with an underside of the platen. The system also includes a base assembly having a storage component and a base magnet coupled with the storage component. The base magnet and the magnet of the platen are magnetically coupled to secure the platen in place relative to the base assembly. The system also includes an electromagnet that is selectively activated to increase a holding strength of the platen to the base assembly. Techniques for selectively activating an electromagnet to increase a holding strength of a platen to a base assembly are also provided.

20 Claims, 7 Drawing Sheets

PLATEN STABILIZATION SYSTEM

BACKGROUND

Self-checkout terminals enable customers to checkout and pay for products without or with minimal staff assistance. Such self-checkout terminals can include a platen or loading plate upon which items can be placed, e.g., so that the items can be weighed. A self-checkout terminal with a sleek design and stable construction can enhance a user's Point of Sale (POS) experience.

DETAILED DESCRIPTION

Self-checkout terminals enable customers to execute self-checkouts. Self-checkout terminals can include a platen or loading plate upon which items can be placed, e.g., so that the items can be weighed. In some instances, an item can be quite heavy or placed on the platen with a relatively aggressive force, causing an impact force on the platen. Such an impact force can cause the platen to "bounce up". Accordingly, stable construction of the platen is generally desirable. Conventional self-checkout terminals have addressed platen stabilization utilizing screws, nuts, springs, etc. to keep the platen in place while also having many cut-out areas on the top surface. Such features can give a self-checkout terminal a less than desirable look and/or feel. A self-checkout terminal with a sleek design and stable construction can enhance a user's Point of Sale (POS) experience.

A self-checkout terminal is disclosed herein. Generally, the self-checkout terminal can include a platen mounted to a base assembly. One or more magnets (e.g., permanent magnets) can be mounted to an underside of the platen. The magnets of the platen can magnetically couple with respective base magnets (e.g., base permanent magnets) of the base assembly, which effectively secures the platen in place. The base assembly can also include an electromagnet. In the event an impact force is detected on the platen, the electromagnet can be activated (e.g., by directing electric current through a coil of the electromagnet) to increase a holding strength of the platen to the base assembly, which can effectively prevent or reduce the platen from "bouncing up" in response to the impact force. Preventing the platen from bouncing up, or at least minimizing the vertical displacement of the platen, can provide enhanced safety for users. For instance, when a platen bounces up too high, there is a risk that users can have one or more of their fingers pinched between the platen and the cabinet. Activation of the electromagnet can eliminate or greatly reduce this risk. Moreover, as the securing mechanisms for platen stabilization are arranged on the underside of the platen, a top surface of the platen can be free of obstructions. In this way, the self-checkout terminal of the present disclosure can be constructed so that the platen has a smooth working surface whilst still providing satisfactory platen stabilization, even in the event of a relatively aggressive impact force. A method of controlling such a self-checkout terminal and a computer program product are also disclosed.

Figure 1:
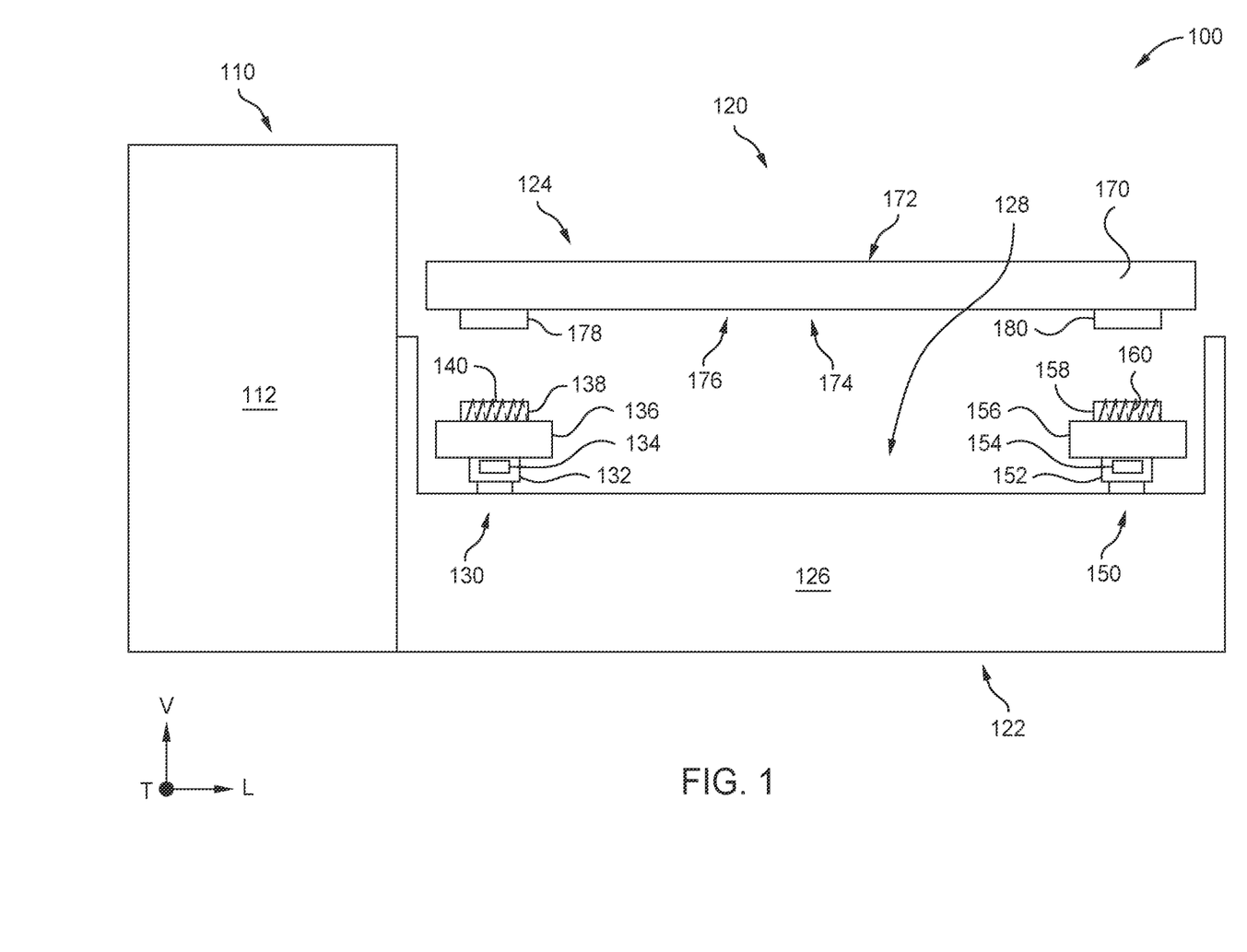
FIG. 1 illustrates one embodiment of a self-checkout terminal in accordance with various aspects as described herein.

With reference now to the figures, FIG. 1 illustrates a schematic cross-sectional view of a self-checkout terminal 100. The self-checkout terminal 100 can be used by users to complete a Point of Sale (POS) transaction, for example. For reference, the self-checkout terminal 100 defines a vertical direction V, a lateral direction L, and a traverse direction T (going into and out of the page in FIG. 1). The vertical direction V, the lateral direction L, and the traverse direction T are mutually perpendicular to one another and form an orthogonal direction system.

As shown in FIG. 1, the self-checkout terminal 100 includes a core unit 110 and a scale unit 120. The core unit 110 can include a settlement terminal 112 that includes, among other components, a barcode scanner, receipt issuer, touch panel, card reader, bill reader, coin reader, and the like that enable a user to execute a self-checkout. The scale unit 120 functions generally to weigh items, such as grocery items, so that the parties to a transaction understand the actual price for the item (or "price-by-weight" item) placed on the scale unit 120.

The scale unit 120 includes a base assembly 122 and a platen assembly 124. In FIG. 1, the platen assembly 124 is shown moved vertically away from the base assembly 122 for illustrative purposes (in FIG. 2, the platen assembly 124 is shown in position relative to the base assembly 122). The base assembly 122 has a storage component, such as a cabinet 126, that defines an interior 128 or recess in which one or more load assemblies are arranged. For the depicted embodiment of FIG. 1, the base assembly 122 has two (2) load assemblies, including a first load assembly 130 and a second load assembly 150 spaced from the first load assembly 130, e.g., along the lateral direction L. In other embodiments, the scale unit 120 can include more or less than two (2) load assemblies. For instance, in one alternative embodiment, the scale unit 120 can include a single load assembly that is centered with respect to a platen of the platen assembly 124.

The first load assembly 130 includes a first scale 132 having a first load cell 134, or first force sensor. The first load cell 134 can be positioned on top of the first scale 132 or embedded therein. A first support bracket 136 is mounted to the first scale 132. In this regard, the first support bracket 136 is coupled with the cabinet 126. A first base permanent magnet 138 is coupled with the first support bracket 136. In at least one example, the first base permanent magnet 138 is mounted to a top side of the first support bracket 136. In addition, the first load assembly 130 includes a first electromagnet 140. The first electromagnet 140 can include a winding or coil through which electric current can be selectively directed to generate a magnetic flux. The first electromagnet 140 can be arranged around the first base permanent magnet 138. In alternative embodiments, the first electromagnet 140 can be arranged adjacent to the first base permanent magnet 138. In yet other embodiments, in addition to a winding or coil, the first electromagnet 140 can include a core around which the winding or coil is arranged. The first electromagnet 140 can be a component of a control system and can be selectively electrically coupled with a power source. An example control system will be disclosed further below.

The second load assembly 150 is arranged in a similar manner as the first load assembly 130. The second load assembly 150 includes a second scale 152 having a second load cell 154, or second force sensor. The second load cell 154 can be positioned on top of the second scale 152 or embedded therein. A second support bracket 156 is mounted to the second scale 152. In this regard, the second support bracket 156 is coupled with the cabinet 126. A second base permanent magnet 158 is coupled with the second support bracket 156. In at least one example, the second base permanent magnet 158 is mounted to a top side of the second support bracket 156. In addition, the second load assembly 150 includes a second electromagnet 160. The second electromagnet 160 can include a winding or coil through which electric current can be selectively directed to generate a magnetic flux. The second electromagnet 160 can be arranged around the second base permanent magnet 158. In alternative embodiments, the second electromagnet 160 can be arranged adjacent to the second base permanent magnet 158. In yet other embodiments, in addition to a winding or coil, the second electromagnet 160 can include a core around which the winding or coil is arranged. The second electromagnet 160 can be a component of the control system and can be selectively electrically coupled with the power source.

Figure 2:
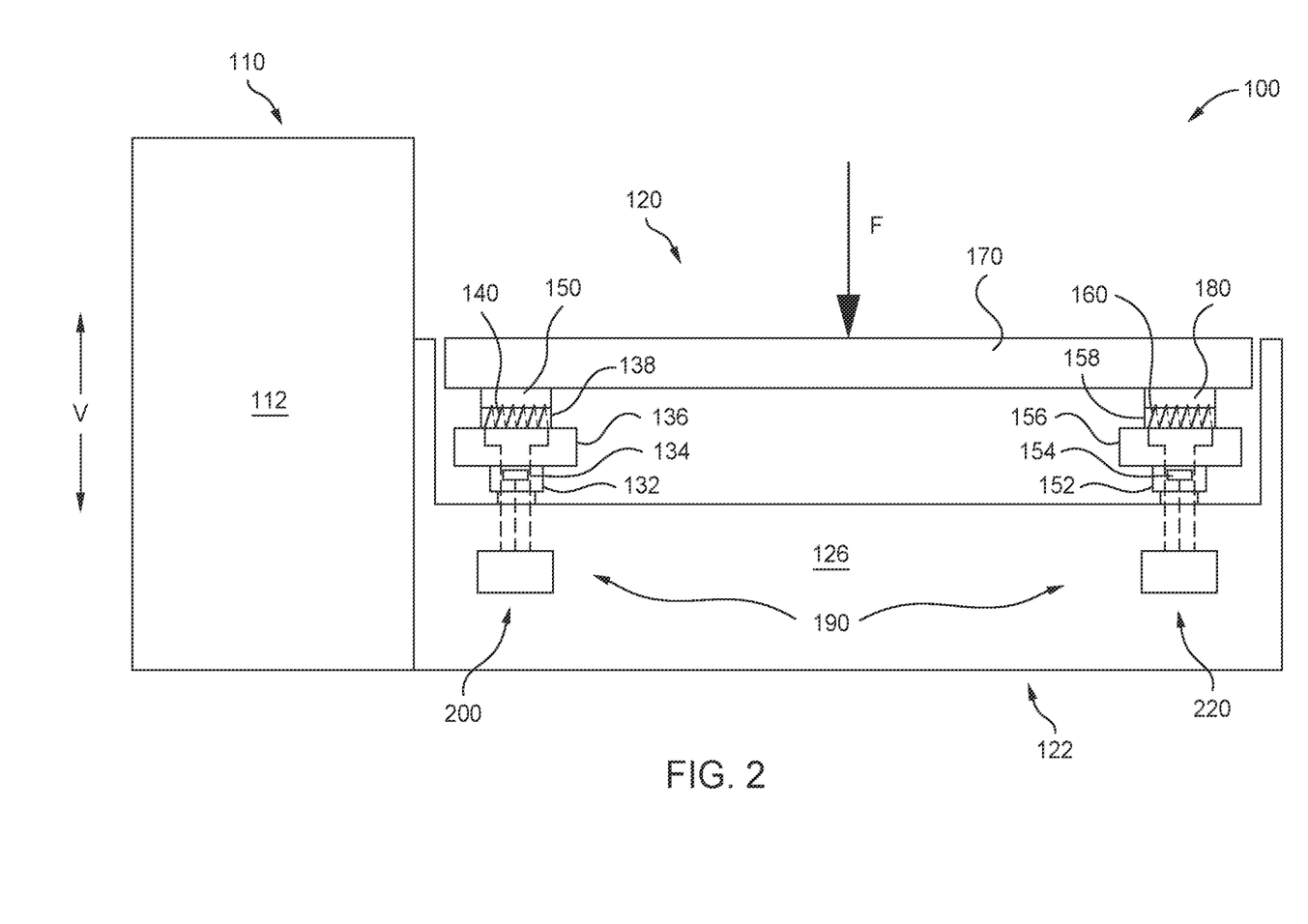
FIG. 2 illustrates the self-checkout terminal of FIG. 1 and depicts a platen thereof undergoing an impact force.

The platen assembly 124 includes a platen 170 or loading plate. The platen 170 has a top surface 172 and a bottom surface 174. The top surface 172 can be a planar surface or can be curved. The bottom surface 174 faces toward the interior 128 of the cabinet 126. During a POS transaction, a user can place a "price-by-weight" item on the top surface 172 of the platen 170, which allows the item to be weighed by the scales of the base assembly 122, or rather, the first scale 132 and the second scale 152. The platen assembly 124 also includes one or permanent magnets arranged on an underside 176 of the platen 170. For the depicted embodiment of FIG. 1, the platen assembly 124 includes a first permanent magnet 178 and a second permanent magnet 180 coupled with the underside 176 of the platen 170. More particularly, the first permanent magnet 178 and the second permanent magnet 180 are attached to the bottom surface 174 of the platen 170. The first permanent magnet 178 and the second permanent magnet 180 are arranged on the bottom surface 174 of the platen 170 so that, when the platen 170 is arranged in position (e.g., as shown in FIG. 2), the first and second permanent magnets 178, 180 of the platen 170 are respectively arranged relative to the first and second base permanent magnets 138, 158 of the base assembly 122. In this way, the platen 170 is magnetically coupled with the base assembly 122. The magnetic coupling of these permanent magnets can be secure the platen 170 in place relative to the base assembly 122. In some embodiments, the first and second permanent magnets 178, 180 of the platen 170 can be physically seated on the first and second base permanent magnets 138, 158 of the base assembly 122, e.g., as shown in FIG. 2.

Advantageously, as the securing mechanisms for stabilizing the platen 170 relative to the base assembly 122 are arranged on the underside 176 of the platen 170, the top surface 172 of the platen 170 can be free of obstructions (e.g., from heads of bolts, cutaways, etc.). In this way, the platen 170 of the self-checkout terminal 100 can have a smooth working surface.

In addition, the first and second electromagnets 140, 160 can be selectively activated to increase a holding strength of the platen 170 to the base assembly 122, e.g., in response to an impact force, or a derivative thereof, reaching or corresponding to a threshold (e.g., a force threshold or a rate threshold). Accordingly, the permanent magnets of the self-checkout terminal 100 can secure and stabilize the platen 170, e.g., during normal operation, while additional holding strength or increased magnetic attraction can be achieved via activation of one or both of the first and second electromagnets 140, 160, e.g., to counteract an impact force on the platen 170. One or both of the first and second electromagnets 140, 160 can be activated by flowing electric current through their respective windings or coils. Example control techniques and systems are provided below.

Figure 3:
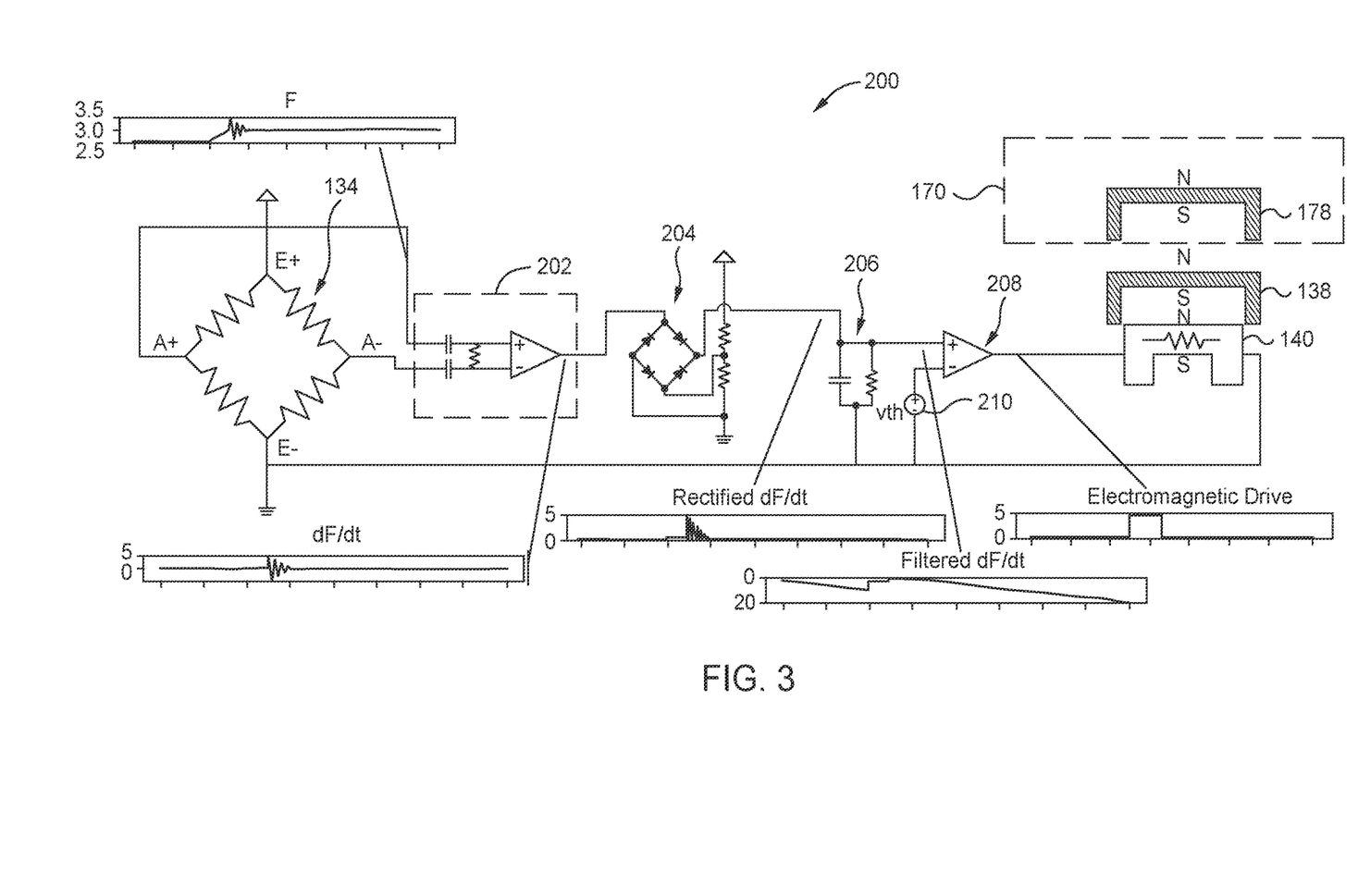
FIG. 3 illustrates one embodiment of a control circuit that can be incorporated into the self-checkout terminal of FIG. 1.

With reference now to FIGS. 2 and 3, FIG. 2 is a schematic cross-sectional view of the self-checkout terminal 100 and depicts an impact force F being applied to the platen 170. The impact force F can be applied by a grocery item being placed "relatively aggressively" on the platen 170, for example. Moreover, FIG. 2 depicts a control system 190 of the self-checkout terminal 100, wherein the control system has a first control circuit 200 associated with the first electromagnet 140 and a second control circuit 220 associated with the second electromagnet 160. FIG. 3 illustrates the first control circuit 200 for control of the first electromagnet 140. The second control circuit 220 can be configured and operate in a same manner as the first control circuit 200.

In response to the impact force F on the platen 170, the first and second control circuits 200, 220 can be used to process the impact force F, and when applicable, activate their respective first and second electromagnets 140, 160. As shown in FIG. 3, the first control circuit 200 includes the first load cell 134, which is operable to detect forces applied on the platen 170, such as the impact force F. A differentiator amplifier 202 is electrically coupled with the first load cell 134 and is operable to receive an output of the first load cell 134. The differentiator amplifier 202 is operable to determine a derivative dF/dt of the impact force F, or rather, the derivative dF/dt of the output of the first load cell 134. The first control circuit 200 can also include a rectifier 204 electrically coupled with the differentiator amplifier 202. The rectifier 204 rectifies the derivative dF/dt of the impact force F, e.g., from Alternating Current (AC) to Direct Current (DC).

The rectified derivative dF/dt can be passed through a filter 206 electrically coupled with the rectifier 204. In FIG. 3, the filter 206 is shown as an RC filter. The filter 206 is operable to filter the rectified derivative of the impact force F, e.g., to remove interference and unwanted noise. In addition, the first control circuit 200 includes a threshold current driver 208 for selectively driving electric current to the first electromagnet 140. When a rate of change of the impact force F, or derivative dF/dt of the impact force F, on the platen 170 reaches or corresponds to a threshold, the threshold current driver 208 drives electric current from a power source 210 (e.g., a current source or voltage source) to the first electromagnet 140. When electric current is driven to the first electromagnet 140 (e.g., as a pulse or electromagnet drive as shown in FIG. 3), a magnetic field is generated at the first electromagnet 140. In at least one example, as shown in FIG. 3, a magnetic field having a polarity that attracts the first permanent magnet 178 of the platen 170 can be generated to increase the magnetic attraction. In this way, the first permanent magnet 178 of the platen 170 is magnetically attracted to both the first base permanent magnet 138 and the first electromagnet 140 when the first electromagnet 140 is activated. Consequently, the holding strength of the platen 170 to the base assembly 122 can be increased to counteract the impact force F and keep the platen 170 stable. The additional holding strength provided by activation of the first and/or second electromagnets 140, 160 can prevent or reduce the platen 170 from "bouncing up" during an impact force event.

The first and second electromagnets 140, 160 can be selectively deactivated in response to the rate of change, or derivative dF/dt, of the impact force F on the platen 170 not reaching or corresponding to the threshold. For instance, when the rate of change of the impact force F falls below the threshold, the threshold current driver 208 can cease driving electric current from the power source 210 to the first electromagnet 140, and the same is true for the second electromagnet 160. When electric current is no longer driven to the first and/or second electromagnets 140, 160, no magnetic field is generated by the first and/or second electromagnets 140, 160. Thus, upon deactivation of the first and second electromagnets 140, 160, the platen 170 is held in place relative to the base assembly 122 by way of the magnetically coupled permanent magnets 138, 178 and 158, 180.

The control system 190 having control circuitry described above provides one example system for controlling the first and/or second electromagnets 140, 160. In other embodiments, however, the first and/or second electromagnets 140, 160 can be controlled by other suitable control circuitry configurations and/or by software processes and/or by combined hardware/circuitry and software processes.

Further, for the depicted embodiment of FIG. 2, the first and second electromagnets 140, 160 are independently controllable via their respective first and second control circuits 200, 220. However, in other embodiments, the first and second electromagnets 140, 160 can be controlled together. Example embodiments are presented below.

Figure 4:
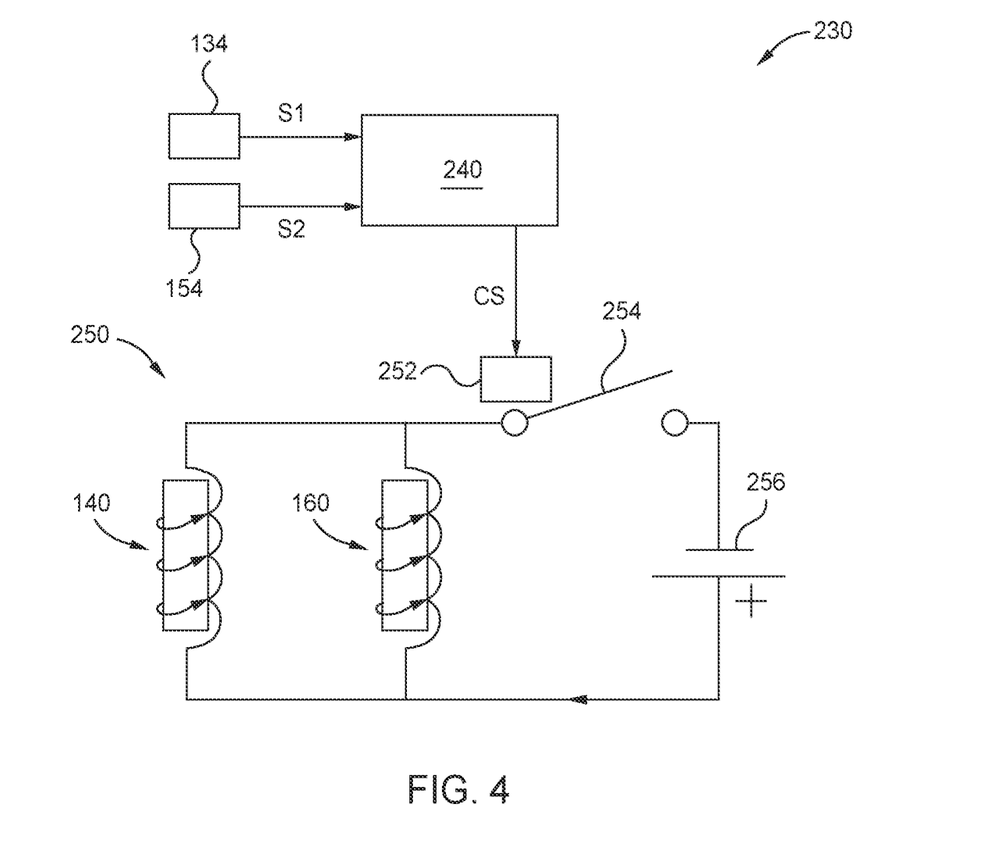
FIG. 4 is a schematic diagram depicting one example control system for controlling first and second electromagnets of a self-checkout terminal.

FIG. 4 is a schematic diagram depicting another example control system 230 for controlling the first and second electromagnets 140, 160. The control system 230 of FIG. 4 can be incorporated into the self-checkout terminal 100 of FIGS. 1 and 2, for example. As shown, the first load cell 134 and the second load cell 154 can sense forces on the platen (not depicted in FIG. 4), such as an impact force. The first and second load cells 134, 154 can output respective signals S1, S2, which each indicate the force on the platen at their respective locations. The signals S1, S2 can be received by one or more computer processors of a computing device 240. The computer processors can execute computer-readable program code, which can be stored on a non-transitory computer-readable storage medium of the computing device 240. In executing the computer-readable program code, the computer processors can determine a derivative of the impact force, or a rate of change of the impact force, and can determine if the rate of change of the impact force exceeds a threshold. A derivative for each reading of the impact force (e.g., from S1 and S2) can be computed, and if one of the computed rates exceeds the threshold, the computer processors of the computing device 240 can output a control signal CS to one or more components of a control circuit 250. Particularly, the control signal CS can be output to a switch driver 252 associated with a switch 254 of the control circuit 250. The switch 254 can be any suitable type of switch. The switch 254 can be a normally-open switch, for example.

The control circuit 250 includes the switch 254, a power source 256 (such as a voltage source or current source), and the first and second electromagnets 140, 160, which are arranged in parallel in the control circuit 250. When the control signal CS causes the switch driver 252 to close the switch 254, electric current can flow from the power source 256 to the first and second electromagnets 140, 160. In this way, the first and second electromagnets 140, 160 can be activated to increase a holding strength of the platen to the base assembly.

The first and second electromagnets 140, 160 can be deactivated in response to the rate of change of the impact force on the platen not reaching or corresponding to the threshold. For instance, the first and second load cells 134, 154 can output respective additional sensed signals, which each indicate the force on the platen at their respective locations. The additional signals can be received by one or more computer processors of the computing device 240, and a derivative for each reading of the impact force (e.g., from the additional signals) can be computed, and if both of the computed rates no longer exceed the threshold, the computer processors of the computing device 240 can output an additional control signal to the switch driver 252 to open the switch 254, which effectively deactivates the first and second electromagnets 140, 160 by preventing the flow of electric current through the control circuit 250.

Figure 5:
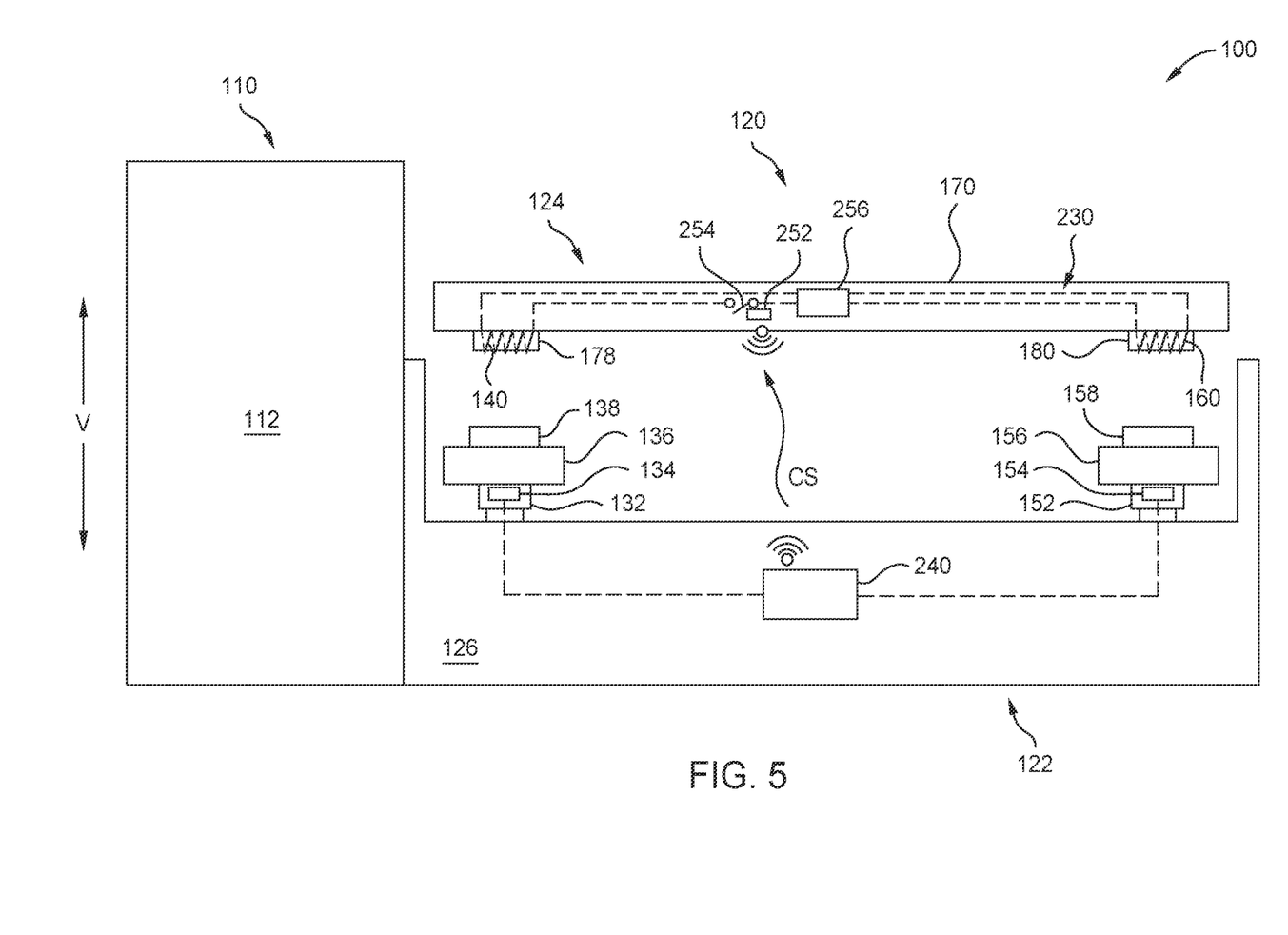
FIG. 5 illustrates another embodiment of a self-checkout terminal in accordance with various aspects as described herein.

FIG. 5 illustrates one alternative embodiment of the self-checkout terminal 100 that can include the control system 230 of FIG. 4. As shown in FIG. 5, the control system 230 is split between the platen assembly 124 and the base assembly 122. Particularly, the platen assembly 124 includes the control circuit 250 that has the first and second electromagnets 140, 160, the switch 254, the switch driver 252, and the power source 256 (e.g., a battery), while the base assembly 122 includes the first and second load cells 134, 154 and the computing device 240.

In the example embodiment of FIG. 5, the first and second electromagnets 140, 160 are respectively arranged around, or positioned adjacent to, the first and second permanent magnets 178, 180 of the platen assembly 124. The computing device 240 can include a communications interface. The communications interface can include a wireless transceiver that allows for wireless communication with other devices, such as a wireless transceiver associated with the switch driver 252. In this regard, in response to an impact force, or derivative thereof, reaching or corresponding to a threshold, the wireless transceiver of the computing device 240 can communicate with the wireless transceiver associated with the switch driver 252. In at least one example, the computing device 240 can output a control signal CS that, when received by the wireless transceiver associated with the switch driver 252, causes the switch driver 252 to close the switch 254 so that electric current flows from the power source 256 to the first and second electromagnets 140, 160. In this way, the first and second electromagnets 140, 160 can be activated to increase the holding strength of the platen 170 to the base assembly 122.

The first and second electromagnets 140, 160 can be deactivated in response to the impact force or the rate of change of the impact force on the platen 170 no longer reaching or corresponding to the threshold. For instance, as noted above, the first and second load cells 134, 154 can output respective additional sensed signals, which each indicate the force on the platen 170 at their respective locations. The additional signals can be received by one or more computer processors of the computing device 240, and a derivative for each reading of the impact force (e.g., from the additional signals) can be computed, and if both of the computed rates no longer exceed the threshold, the computer processors of the computing device 240 can output an additional control signal wirelessly to the switch driver 252 to open the switch 254, which effectively deactivates the first and second electromagnets 140, 160 by preventing the flow of electric current through the control circuit 250.

In some further alternative embodiments, each component of the control system 230 of FIG. 4 can be a part of the base assembly 122, particularly where the first and second electromagnets 140, 160 are arranged on, or positioned adjacent to, their respective first and second base permanent magnets 138, 158 of the base assembly 122, such as in FIG. 1.

Figure 6:
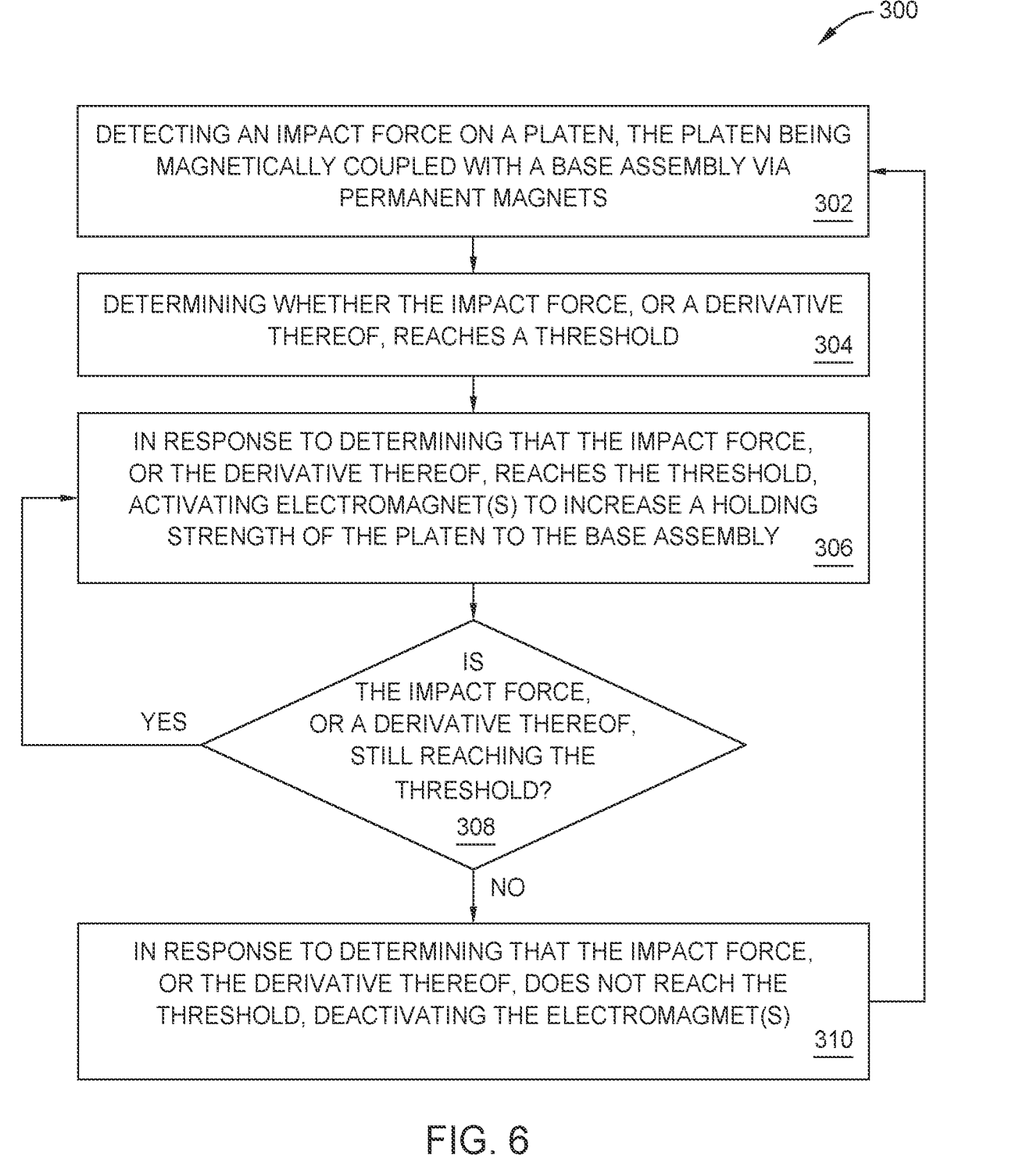
FIG. 6 is a flow diagram of one example method of controlling a self-checkout terminal in accordance with various aspects as described herein.

FIG. 6 is a flow diagram of one example method 300 of controlling a self-checkout terminal in accordance with various aspects as described herein.

At 302, the method 300 can include detecting an impact force on a platen, the platen being magnetically coupled with a base assembly via permanent magnets. For instance, the self-checkout terminal can include one or more load cells each configured to convert an impact force into a measurable electrical output.

At 304, the method 300 can include determining whether the impact force, or a derivative thereof, reaches or corresponds to a threshold. For instance, the self-checkout terminal can include a control system that can include control circuitry, a computing device, some combination thereof, etc. that can be used to determine whether the impact force, or a derivative thereof (e.g., a rate of change of the impact force), exceeds a threshold. In some implementations, determining whether the impact force, or the derivative thereof, reaches the threshold includes determining the derivative of the impact force, rectifying the derivative of the impact force, filtering the rectified derivative of the impact force, and determining whether the filtered and rectified derivative of the impact force reaches the threshold.

At 306, the method 300 can include in response to determining that the impact force, or the derivative thereof, reaches or corresponds to the threshold, activating electromagnet(s) to increase a holding strength of the platen to the base assembly. For instance, upon determining that the impact force, or the derivative thereof, reaches the threshold at 304, electric current can be driven to one or more electromagnets to generate magnetic fields at the respective electromagnets. The direction of electric current through the coil or winding of a given electromagnet can produce a certain polarity that causes the permanent magnet coupled with the platen to be magnetically attracted to the given electromagnet. Stated another way, when a given electromagnet is selectively activated, the electromagnet magnetically couples with a corresponding permanent magnet of the platen assembly. In this way, the permanent magnet coupled with the platen can be magnetically attracted to the given electromagnet in addition to the permanent magnet of the base assembly. Such attraction increases the holding strength of the platen to the base assembly.

In some implementations, activating electromagnet(s) to increase the holding strength of the platen to the base assembly can include driving, by a threshold current driver, electric current to the electromagnet. Electric current can be driven from a power source to the electromagnet. In yet other implementations, activating electromagnet(s) to increase the holding strength of the platen to the base assembly can include causing a switch to modulate so that electric current flows from a power source to one or more of the electromagnets. In some implementations, the electromagnets can be independently activated. In other implementations, the electromagnets can be activated together or collectively.

At 308, the method 300 can include determining whether the impact force, or derivative thereof, still reaches or corresponds to the threshold. As depicted in FIG. 6, when the impact force, or derivative thereof, still reaches the threshold, the method 300 reverts to 306 where the electromagnet(s) remain active. However, when the impact force, or derivative thereof, no longer reaches the threshold, the method 300 proceeds to 310. The determination at 308 can be made based on additional sensor outputs by the one or more load cells.

At 310, the method 300 can include, in response to determining that the impact force, or the derivative thereof, does not reach or correspond to the threshold as determined at 308, deactivating the electromagnet(s). For instance, deactivating the electromagnet(s) can include ceasing flowing electric current through the electromagnets. In some implementations, deactivating the electromagnet(s) can include modulating a switch to open a circuit. In some implementations, deactivating the electromagnet(s) can be accomplished passively by a threshold voltage of a field-effect transistor (FET) or the like reaching a predefined voltage where a conducting path between the source and drain terminals ceases. Upon deactivating the electromagnet(s), the platen can be stabilized relative to the base assembly by the magnetically coupled permanent magnets of the platen and base assembly. The method 300 can revert to 302 to handle future potential impact forces.

In some alternative implementations of the method 300, at 306, the electromagnet(s) can be activated for a predetermined time, e.g., 10 milliseconds, 1 second, 2 seconds, etc. Upon expiration of the predetermined time, the electromagnet(s) can be automatically deactivated. The method 300 can then revert to 302 to handle future potential impact forces.

Figure 7:
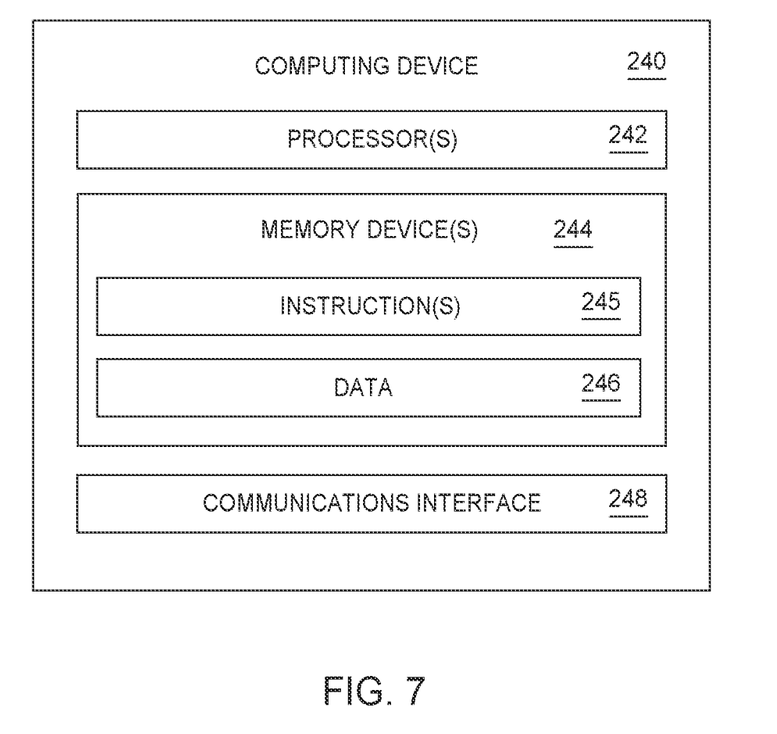
FIG. 7 is a block diagram of an example computing system in accordance with various aspects as described herein.

FIG. 7 is a schematic block diagram of the computing device 240. As depicted, the computing device 240 includes one or more processors 242, one or more memory devices 244 (e.g., one or more non-transitory memory devices), and a communications interface 248 operable to transmit and/or receive transmissions, such as sensor outputs, control signals, etc. The one or more memory devices 244 can include instructions 245, such as computer-readable instructions, and data 246 that are stored thereon. When the instructions 245 are executed by the one or more processors 242, the one or more processors 242 can be caused to perform an operation, such as any of the operations disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A system, comprising:
 a platen assembly having a platen and a magnet coupled with an underside of the platen; and
 a base assembly having a storage component and a base magnet coupled with the storage component, the base magnet and the magnet of the platen are magnetically coupled to secure the platen in place relative to the base assembly; and
 an electromagnet that is selectively activated to increase a holding strength of the platen to the base assembly.

2. The system of claim 1, wherein, when the electromagnet is selectively activated, the electromagnet magnetically couples with the magnet of the platen assembly.

3. The system of claim 1, wherein the electromagnet is selectively activated to increase the holding strength of the platen to the base assembly in response to a rate of change of an impact force on the platen corresponding to a threshold.

4. The system of claim 3, wherein the electromagnet is selectively deactivated in response to the rate of change of the impact force on the platen no longer corresponding to the threshold.

5. The system of claim 1, wherein the base assembly has a scale and a support bracket, and wherein the scale is mounted on the storage component and the support bracket is mounted on the scale, and wherein the base magnet is mounted on the support bracket and the electromagnet is arranged around, or adjacent to, the base magnet.

6. The system of claim 5, wherein a load cell is arranged on or embedded within the scale.

7. The system of claim 1, wherein the base magnet is a first base magnet and the electromagnet is a first electromagnet, and wherein the first base magnet and the first electromagnet are components of a first load assembly, and wherein the base assembly further comprises:
 a second load assembly spaced from the first load assembly, the second load assembly comprising:
  a second base magnet coupled with the storage component, the second base magnet and a second magnet coupled with the underside of the platen are magnetically coupled to secure the platen in place relative to the base assembly; and
  a second electromagnet that is selectively activated to increase the holding strength of the platen to the base assembly.

8. The system of claim 7, wherein the first and second electromagnets are independently controllable.

9. The system of claim 7, wherein the first and second electromagnets are arranged along a control circuit in parallel.

10. The system of claim 1, wherein a top surface of the platen is free of obstructions.

11. The system of claim 1, further comprising:
 a control circuit, comprising:
  a load cell for detecting an impact force on the platen;
  a differentiator amplifier electrically coupled with the load cell for determining a derivative of the impact force;
  a rectifier electrically coupled with the differentiator amplifier for rectifying the derivative of the impact force;
  a filter electrically coupled with the rectifier for filtering the rectified derivative of the impact force; and
  a threshold current driver for selectively driving electric current to the electromagnet.

12. The system of claim 11, wherein, when a rate of change of the impact force on the platen corresponds to a threshold, the threshold current driver drives electric current to the electromagnet.

13. The system of claim 12, wherein, when the rate of change of the impact force on the platen corresponds to the threshold, the threshold current driver drives electric current to the electromagnet until the rate of change does not correspond to the threshold.

14. The system of claim 12, wherein, when the rate of change of the impact force on the platen corresponds to the threshold, the threshold current driver drives electric current to the electromagnet for a predetermined time, and upon expiration of the predetermined time, the threshold current driver ceases driving electric current to the electromagnet.

15. A method comprising:
 detecting an impact force on a platen, the platen being magnetically coupled with a base assembly via two or more magnets;
 determining that the impact force, or a derivative of the impact force, corresponds to a threshold; and
 in response to determining that the impact force, or the derivative of the impact force, corresponds to the threshold, activating an electromagnet to increase a holding strength of the platen to the base assembly.

16. The method of claim 15, further comprising:
 in response to determining that the impact force, or the derivative of the impact force, no longer corresponds to the threshold, deactivating the electromagnet.

17. The method of claim 15, wherein the two or more magnets include a magnet coupled with an underside of the platen and a base magnet coupled with the base assembly.

18. The method of claim 15, wherein determining that the impact force, or the derivative of the impact force, corresponds to the threshold comprises:
 determining the derivative of the impact force;
 rectifying the derivative of the impact force;
 filtering the rectified derivative of the impact force; and
 determining whether the filtered and rectified derivative of the impact force corresponds to the threshold.

19. The method of claim 15, wherein the electromagnet is activated to increase the holding strength of the platen to the base assembly for a predetermined time, and upon expiration of the predetermined time, the electromagnet is automatically deactivated.

20. A computer program product for securing a platen relative to a base assembly, the computer program product comprising:
 a non-transitory computer-readable storage medium having computer-readable program code embodied therewith, the computer-readable program code executable by one or more computer processors to:
  determine that an impact force on the platen, or a derivative of the impact force, corresponds to a threshold, the platen is magnetically coupled with the base assembly via two or more magnets; and in response to determining that the impact force, or the derivative of the impact force, corresponds to the threshold, activating an electromagnet to increase a holding strength of the platen to the base assembly.

\* \* \* \* \*